United States Patent [19]

Mastrofrancesco et al.

[11] Patent Number: 4,914,970
[45] Date of Patent: Apr. 10, 1990

[54] AUTOMOTIVE STEERING COLUMN MOUNTING ASSEMBLY

[75] Inventors: Luigi Mastrofrancesco; Gary M. Sopko, both of Livonia, Mich.

[73] Assignee: Ford Motor Company, Dearborn, Mich.

[21] Appl. No.: 226,913

[22] Filed: Aug. 1, 1988

[51] Int. Cl.⁴ ............................................. B62D 1/18
[52] U.S. Cl. ........................................ 74/492; 188/67; 188/376; 248/900; 280/777; 403/267; 403/269; 403/273
[58] Field of Search ................. 74/492; 188/67, 376; 403/267, 269, 273; 280/777; 248/900

[56] References Cited

U.S. PATENT DOCUMENTS

| | | | |
|---|---|---|---|
| 3,373,965 | 3/1968 | Bien et al. | 74/492 X |
| 3,394,613 | 7/1968 | Curtindale | 74/492 |
| 3,415,140 | 12/1968 | Bien et al. | 280/777 X |
| 3,621,732 | 11/1971 | Kaniut | 74/492 |
| 3,679,163 | 7/1972 | Smith | 74/492 X |
| 3,813,960 | 6/1974 | Windett | 74/492 |
| 3,945,662 | 3/1976 | Murase et al. | 280/777 |
| 4,102,217 | 7/1978 | Yamamoto et al. | 280/777 X |
| 4,241,937 | 12/1980 | Eggen et al. | 74/492 X |

FOREIGN PATENT DOCUMENTS 2653377  7/1977  Fed. Rep. of Germany ........ 74/492

Primary Examiner—Allan D. Herrmann
Attorney, Agent, or Firm—Jerome R. Drouillard; Roger L. May

[57] ABSTRACT

A mounting assembly for releasably securing a steering column of a motor vehicle to the chassis of the vehicle includes a bracket attached to the steering column, with the bracket having a plurality of rearwardly opening primary apertures therein, and a plurality of modules molded in place upon the bracket, with each of the modules registered with one of the rearwardly opening apertures, and with each of the modules including a solid body having an annular groove which (i) is formed during the molding of the module; (ii) which circumscribes a portion of the module and (iii) which is in contact with the bracket. Each module has an aperture through which a fastener may be inserted so as to secure the bracket to the chassis of the vehicle.

14 Claims, 2 Drawing Sheets

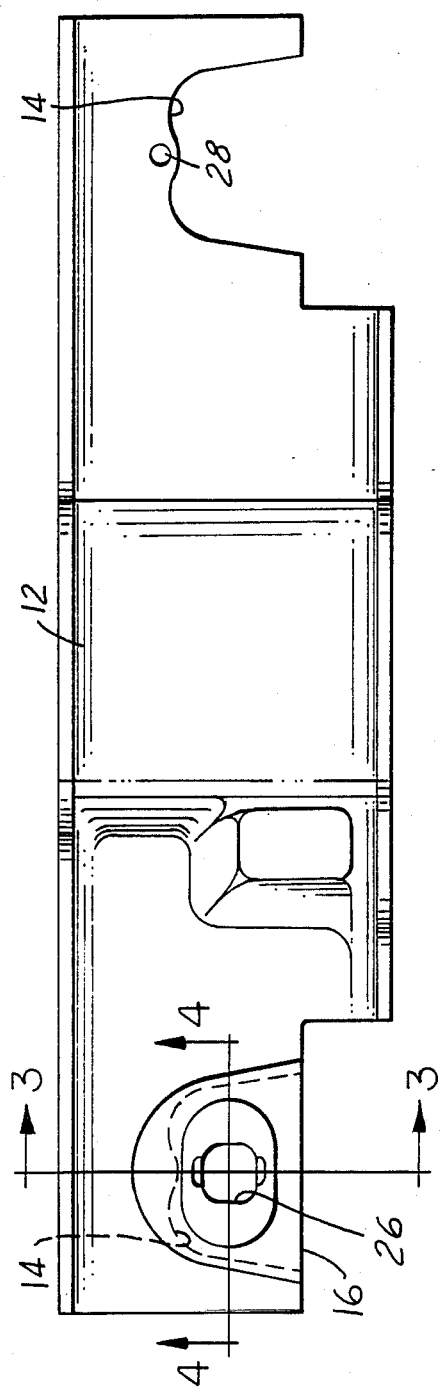
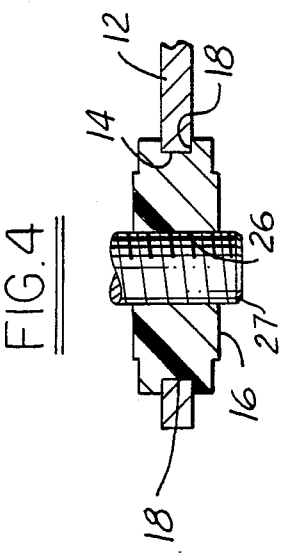
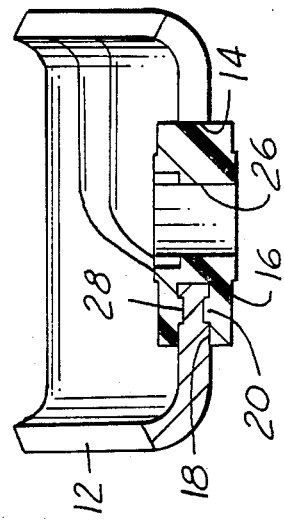

AUTOMOTIVE STEERING COLUMN MOUNTING ASSEMBLY

BACKGROUND OF THE INVENTION

This invention relates to a mounting assembly for releasably securing a steering column to the chassis of a vehicle.

DISCLOSURE INFORMATION

The mounting of a steering column within a vehicle presents a challenge to designers because although it is usually desirable to mount the steering column in a fairly rigid manner so as to minimize unwanted vibration of the column, it is necessary that the steering column be permitted to disengage from its mounting structure in the event that the driver's body impacts the steering wheel during a crash. Accordingly, designers have devised a number of solutions. U.S. Pat. No. 3,373,965 discloses one type of steering column mounting in which a frictional clamp secures the steering column to the chassis of the vehicle. Other such frictional devices are known. Those skilled in the art appreciate that such devices have limited functional capability because they are subject to the vagaries which apply to all types of frictional machines—e.g., variations in friction which result in large variations in the amount of force needed to activate the device.

U.S. Pat. Nos. 3,394,613 and 3,813,960 disclose steering column mounting brackets in which individual shear modules are applied to a bracket such that the steering column will not be released from its normal position unless and until a shearing action occurs between the shear module and the balance of the mounting bracket. U.S. Pat. No. 3,813,960 discloses yet another configuration in which a separate shear module is placed upon a bracket and a plastic material such as nylon is injected between the module and the bracket in such fashion that the nylon must shear before the module can be detached from the bracket.

The system of the '960 patent suffers from two potential disadvantages. The first, injecting a precise amount of nylon between the module and the remainder of the bracket may be difficult because of the small size of the channels through which the nylon must flow during the injection process. Secondly, shrinkage of the nylon as it cures or hardens may cause the module to loosen, with the result that the steering column will be undesirably allowed to shake when the vehicle is operated. A steering column mounting assembly according to the present invention is intended to overcome both of these problems.

.It is an object of the present invention to provide a mounting assembly for releasably securing a steering column of a motor vehicle to the chassis of the vehicle which allows the steering column to be mounted without undesirable vibration but which allows the steering column to be released effectively under specific conditions.

It is an advantage of the Present invention that a steering column mounting assembly according to this invention will produce more predictable results in terms of the loads necessary to release the column from its mounting.

It is yet another advantage of the present invention that a steering column mounting assembly according to this invention will be more easily produced than prior art mounting systems because the requirement for separate shear modules has been eliminated.

Other objects, features and advantages of the present invention will become apparent to those skilled in the art upon reading this document.

SUMMARY OF THE DISCLOSURE

In accordance with the present invention, an automotive steering column mounting assembly for releasably securing a steering column of a motor vehicle to the chassis of the vehicle comprises a bracket attached to the steering column, with the bracket having a plurality of rearwardly opening primary apertures therein, and a plurality of modules molded in place upon the bracket, with each of the modules registered with one of the rearwardly opening apertures, and with each of said modules comprising a solid body having an annular groove which (i) is formed during the molding of the module; (ii) which circumscribes a portion of said module; and (iii) which is in contact with said bracket, with said module further having an aperture through which a fastener may be inserted so as to secure said bracket to the chassis of said vehicle. Said bracket further preferably comprises a plurality of secondary apertures, with at least one of the secondary apertures extending through said bracket in a location adjoining each of said primary apertures such that each of said modules will further comprise a shear pin molded integrally with the remainder of said module, with said shear pin extending through said annular groove. Alternatively, said bracket may further comprise a plurality of shear button indentations, with at least one of said indentations extending into said bracket in a location adjoining each of said primary apertures such that each of said modules will further comprise a shear button molded integrally with the remainder of the module, with each shear button extending into said annular groove. The aforesaid modules preferably comprise a plastic material which may be injection molded to said bracket. It is thus seen that each of said modules comprises a solid body substantially filling and extending beyond one of the open-ended primary apertures formed in the bracket, which may be rigidly attached to the steering column. In addition to substantially filling said primary aperture, the solid body portion of the module may extend beyond the aperture so that it abuts both faces of the bracket in a region adjacent to the aperture. Because, as noted above, the modules are preferably formed so that the plastic from which the module is molded extends into a second cavity formed in the bracket, the module will disengage from the bracket only after the plastic extending into the cavity has been sheared from the remainder of the module.

BRIEF DESCRIPTION OF THE DRAWINGS

FIG. 2 a plan view of the bracket portion of the mounting assembly according to the present invention showing one module attached thereto.

FIG. 3 is a sectional view of the bracket shown in FIG. 2 taken along the line 3—3 of FIG. 2.

FIG. 4, is a sectional view of the bracket of FIG. 2 taken along the line 4-4 of FIG. 2.

DESCRIPTION OF THE PREFERRED EMBODIMENT

Figure 1:
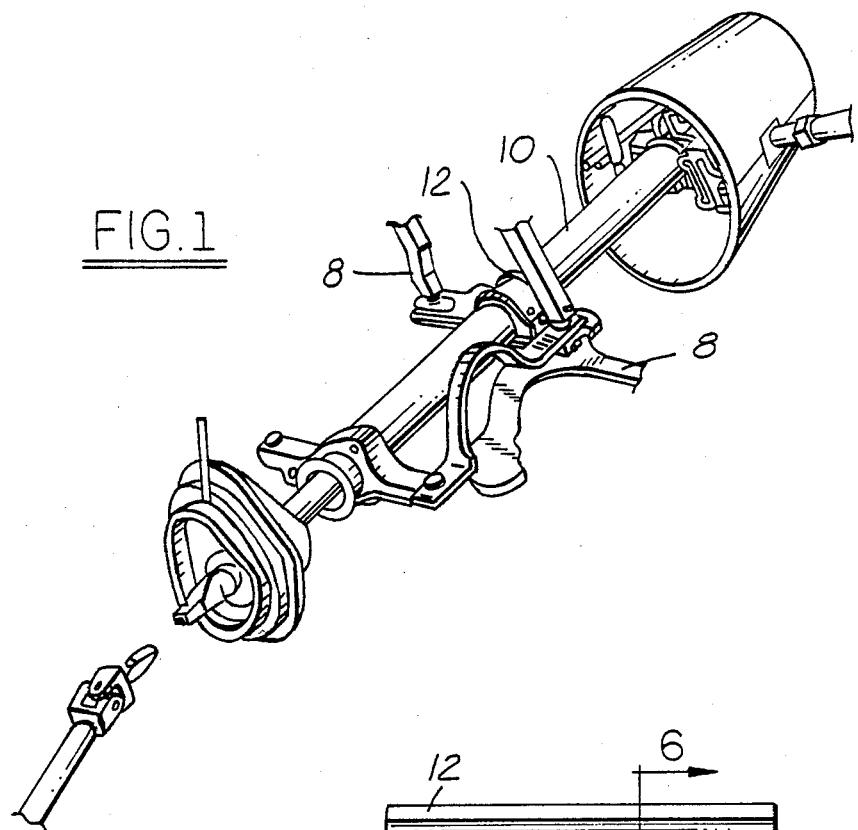
FIG. 1 is a perspective view of an automotive steering column attached to a vehicular chassis by means of a mounting asset according to the present invention.

As shown in FIG. 1, a steering column mounting assembly according to the present invention is intended for fastening a steering column to the chassis of a vehicle. Bracket 12 is shown in FIG. 1 as being superimposed upon an upper portion of steering column 10. The bracket is preferably mounted to the steering column rigidly. This may be accomplished by welding or by any other suitable process or mechanism. Certain details of a bracket according to the present invention are shown in FIG. 2. The illustrated bracket may be formed from stamped mild steel. Those skilled in the art will appreciate in view of this disclosure that other types of materials could be employed such as ferrous and nonferrous metals and metallic and nonmetallic compositions, which could be used in several processes known to those skilled in the art and suggested by this disclosure. For example, the bracket could be made of nonferrous metals by such processes as die casting or other known processes.

Regardless of the particular process employed for fabrication, a bracket according to the present invention will have at least two primary apertures 14 formed in one edge of the bracket. As illustrated in FIG. 2, apertures 14 are located in the rearward portion of the bracket—i.e., the portion which is closest to the driver during operation of the vehicle. This allows the bracket to become disengaged from the chassis of the vehicle in the event that the steering column is subjected to a forwardly directed impact by the driver of the vehicle. It is noted that each of primary apertures 14 has a slight V-shape with the widest part of the V at the rearward terminus of the aperture. This shape helps to promote disengagement of modules 16, which are positioned in primary apertures 14.

Figure 6:
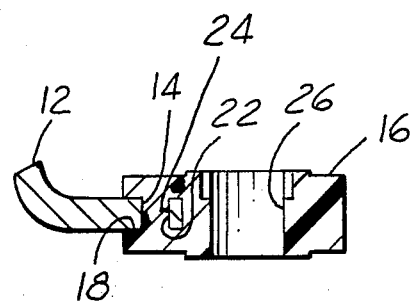
FIG. 6 is a sectional view of the bracket of FIG. 5 taken along the line 6—6 of FIG. 5.

Details of construction of modules 16 are shown in FIGS. 3, 4 and 6. As shown with particularity in FIG. 4, each module comprises a solid body having an annular groove, 18, which is formed during the molding of the module, which circumscribes a portion of the module, and which is in contact with bracket 12 in the vicinity of aperture 14. It is thus seen that each of the modules comprises a solid body substantially filling and extending beyond one of said apertures 14 and abutting both faces of the bracket in a region adjacent to the aperture. Those skilled in the art will appreciate in view of this disclosure that modules according to the present invention could be molded from a variety of materials by injection molding and other processes. A presently preferred molding process is the so-called insert molding process in which bracket 12 itself forms a part of the mold cavity. Materials suitable for a module according to this invention could comprise, for example, 33% glass-filled nylon or polypropylene or other types of materials such as nonferrous metals or metallic or nonmetallic composite materials suitable for this use and suggested by this disclosure.

The combination of the open ended apertures 14 and the structure of modules 16, which overlay both faces of bracket 12, allows the modules to slide rearwardly from the bracket in the event that sufficient force is applied to the bracket by the steering column. Such force will be passed into the chassis of the vehicle by means of a fastener 27 inserted through aperture 26 into the chassis of the vehicle.

The amount of force required to disengage each of modules 16 from bracket 12 will depend upon at least two factors. First, because the modules are molded in place upon bracket 12, shrinkage of the molded material will cause the module to fit tightly to the bracket. This will produce a frictional engagement between the module and the bracket. Because the molded material does shrink upon cooling as part of the molding process, a bracket including modules according to the present invention may be employed for mounting a steering column without the objectionable shake found in certain prior art mounting systems, while at the same time allowing the modules to be extracted from the bracket upon the imposition of a predictable and repeatable level of force.

The amount of force required to extract modules 16 from bracket 12 according to the present invention is further dependent upon the function of a shearing feature incorporated into the present invention. FIGS. 2 and 3 show a first embodiment of such a shearing feature. As shown in FIG. 2, bracket 12 may be equipped with one or more indentations, 28, extending from at least one face of the bracket into the bracket itself in a location adjoining each of primary apertures 14. Thus, as shown in FIG. 3, at the time module 16 is molded in place upon bracket 12, one or more shear buttons, 20, will be at the same time molded integrally with the remainder of the module. FIG. 3 shows that shear buttons 20 extend into annular groove 18 defined by the bracket's intrusion into the module. It is easily seen that extraction of the modules from the bracket will cause a shearing of shear buttons 20. This has been found to result in a reproducible and predictable force requirement for such extraction.

Figure 5:
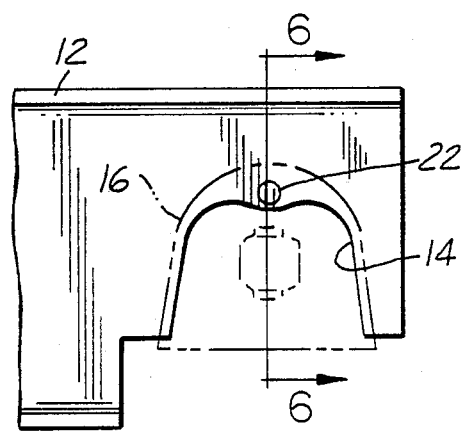
FIG. 5 a partial plan view of a bracket comprising a portion of an assembly according to the present invention showing a primary and a secondary aperture therein.

FIGS. 5 and 6 show a second embodiment of a shear structure according to the present invention in which aperture 22 is formed in bracket 12 in a location adjoining each of primary apertures 14 such that a shear Pin, 24, will be formed integrally with the remainder of module 16 when the module itself is formed. As seen in FIG. 6, shear pin 24 extends through annular groove 18 defined by the periphery of primary aperture 14. The function of shear pin 24 during extraction of the module is similar to the function of shear buttons 20. In other words, module 16 cannot be extracted from bracket 12 until shear pin 24 has broken away from the balance of the module.

Those skilled in the art will appreciate in view of this disclosure that a steering column mounting assembly according to the Present invention will be economically producible because the insert molded modules eliminate the need for a separate module and an associated means for attaching the module to the steering column mounting bracket. Further, those skilled in the art will appreciate that a module according to the present invention will eliminate problems resulting from steering column vibration associated with separate modules bonded to a steering column mounting bracket.

Various modifications and variations will no doubt occur to those skilled in the art to which this invention pertains. All such variations which basically rely upon the teachings with which this disclosure has advanced the art are properly considered within the scope of this invention as defined by the appended claims.

We claim:

1. A mounting assembly for releasably securing a steering column of a motor vehicle to the chassis of said vehicle, comprising:
   a bracket adapted to be attached to said steering column, with said bracket having a plurality of rearwardly opening primary apertures therein; and
   a plurality of modules molded in place upon said bracket, with each of said modules registered with one of said rearwardly opening apertures, and with each of said modules comprising a solid body having an annular groove which (i) is formed during the molding of said module; and (ii) which circumscribes a portion of said module.

2. A mounting assembly according to claim 1 wherein said module further comprises an aperture through which a fastener may be inserted so as to secure said bracket to the chassis of said vehicle.

3. A mounting assembly according to claim 1 wherein said bracket further comprises a plurality of secondary apertures, with at least one of said secondary apertures extending through said bracket in a location adjoining each of said primary apertures such that each of said modules will further comprise a shear pin molded integrally with the remainder of said module, with said shear pin extending through said annular groove.

4. A mounting assembly according to claim 1 wherein said bracket further comprises a plurality of shear button indentations, with at least one of said indentations extending into said bracket in a location adjoining each of said primary apertures such that each of said modules will further comprise a shear button molded integrally with the remainder of said module, with said shear button extending into said annular groove.

5. A mounting assembly according to claim 1 wherein said module comprises a plastic material.

6. A mounting assembly according to claim 1 wherein said module comprises an insert molded thermoplastic material.

7. A mounting assembly for releasably securing a steering column of a motor vehicle to the chassis of said vehicle, comprising:
   a bracket rigidly attached to said steering column, with said bracket having a plurality of open-ended primary apertures therein; and
   a plurality of modules molded in place upon said bracket, with each of said modules registered with one of said open-ended apertures, and with each of said modules comprising a solid body substantially filling and extending beyond said aperture and abutting both faces of said bracket in a region adjacent to said aperture, with said module further having an aperture through which a fastener may be inserted so as to secure said bracket to the chassis of said vehicle.

8. A mounting assembly according to claim 7 wherein said bracket further comprises a plurality of secondary apertures, with at least one of said secondary apertures extending through said bracket in a location adjoining each of said primary apertures such that each of said modules will further comprise a shear pin molded integrally with the remainder of said module, with said shear pin extending through said bracket from one abutting portion of said module to the other abutting portion.

9. A mounting assembly according to claim 7 wherein said bracket further comprises a plurality of shear button indentations, with at least one of said indentations extending into said bracket in a location adjoining each of said primary apertures such that each of said modules will further comprise a shear button molded integrally with the remainder of said module, with each such shear button extending into one of said indentations.

10. A mounting assembly according to claim 7 wherein said module comprises an injection molded thermoplastic material.

11. A mounting assembly for releasably securing a steering column of a motor vehicle to the chassis of said vehicle, comprising:
    a bracket rigidly attached to said steering column, with said bracket having a plurality of open-ended primary apertures therein; and
    a plurality of plastic shear modules molded in place upon said bracket, with each of said modules registered with one of said open-ended apertures, and with each of said modules comprising a solid body (i) substantially filling said aperture; (ii) overlaying both faces of said bracket in a region adjacent to said aperture; and (iii) extending into an indentation formed in said bracket, whereby said module will disengage from said bracket only after the plastic extending into said indententation has been sheared from the remainder of said module.

12. A mounting assembly according to claim 11 wherein each of said modules further comprises an aperture through which a fastener may be inserted so as to secure said bracket to the chassis of said vehicle.

13. A steering column and mounting assembly for an automotive vehicle, comprising:
    a steering column; and
    a mounting assembly for securing said steering column to said vehicle, comprising:
       a bracket rigidly attached to said steering column, with said bracket having a plurality of open-ended primary apertures therein; and
       a plurality of plastic shear modules molded in place upon said bracket, with each of said modules registered with one of said open-ended apertures, and with each of said modules comprising a solid body (i) substantially filling said aperture; (ii) overlaying both faces of said bracket in a region adjacent to said aperture; and (iii) extending into an indentation formed in said bracket, whereby said module will disengage from said bracket-only after the plastic extending into said indentation has been sheared from the remainder of said module.

14. A mounting assembly according to claim 13 wherein each of said modules further comprises an aperture through which a fastener may be inserted so as to secure said bracket to the chassis of said vehicle.

* * * * *

UNITED STATES PATENT AND TRADEMARK OFFICE
CERTIFICATE OF CORRECTION

PATENT NO. : 4,914,970

DATED : April 10, 1990

INVENTOR(S) : Luigi Mastrofrancesco, Gary M. Sopko and James F. Stewart

It is certified that error appears in the above-identified patent and that said Letters Patent is hereby corrected as shown below:

On the cover sheet item [75] should read as shown:

--Inventors: Luigi Mastrofrancesco; Gary M. Sopko, both of Livonia, James F. Stewart, Clawson, all of Michigan--.

Signed and Sealed this

Twenty-sixth Day of March, 1991

Attest:

HARRY F. MANBECK, JR.

Attesting Officer

Commissioner of Patents and Trademarks